United States Patent
Zhang et al.

(10) Patent No.: US 10,983,524 B2
(45) Date of Patent: Apr. 20, 2021

(54) SENSOR AGGREGATION FRAMEWORK FOR AUTONOMOUS DRIVING VEHICLES

(71) Applicant: Baidu USA LLC, Sunnyvale, CA (US)

(72) Inventors: Liangliang Zhang, Sunnyvale, CA (US); Dong Li, Sunnyvale, CA (US); Jiangtao Hu, Sunnyvale, CA (US); Jiaming Tao, Sunnyvale, CA (US); Yifei Jiang, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 371 days.

(21) Appl. No.: 15/952,101

(22) Filed: Apr. 12, 2018

(65) Prior Publication Data

US 2019/0317513 A1 Oct. 17, 2019

(51) Int. Cl.
| | |
|---|---|
| *G05D 1/02* | (2020.01) |
| *G01C 21/34* | (2006.01) |
| *G05D 1/00* | (2006.01) |
| *G06N 20/00* | (2019.01) |

(52) U.S. Cl.
CPC ....... *G05D 1/0221* (2013.01); *G01C 21/3446* (2013.01); *G05D 1/0088* (2013.01); *G05D 1/0214* (2013.01); *G06N 20/00* (2019.01); *G05D 2201/0213* (2013.01)

(58) Field of Classification Search
CPC .. G05D 1/0221; G05D 1/0088; G05D 1/0214; G06N 20/00; G01C 21/3446
See application file for complete search history.

(56) References Cited

U.S. PATENT DOCUMENTS

2018/0348785 A1* 12/2018 Zheng ............... G06N 3/006
2019/0118829 A1*  4/2019 Goldberg ........... B60W 60/001

FOREIGN PATENT DOCUMENTS

WO         2018053175         3/2018

* cited by examiner

*Primary Examiner* — Michael D Lang
(74) *Attorney, Agent, or Firm* — Womble Bond Dickinson (US) LLP

(57) ABSTRACT

A sensor aggregation framework for autonomous driving vehicles is disclosed. In one embodiment, sensor data is collected from one or more sensors mounted on an autonomous driving vehicle (ADV) while the ADV is moving within a region of interest (ROI) that includes a number of obstacles. The sensor data includes obstacle information of the obstacles and vehicle data of the ADV. Each of the vehicle data is timestamped with a current time at which the vehicle data is captured to generate a number of timestamps that correspond to the vehicle data. The obstacle information, the vehicle data, and the corresponding timestamps are aggregated into training data. The training data is used to train a set of parameters that is subsequently utilized to predict at least in part future obstacle behaviors and vehicle movement of the ADV.

21 Claims, 10 Drawing Sheets

| Vehicle Data 131 | Timestamps 132 |
|---|---|
| DATA_1 | TS_1 |
| DATA_2 | TS_2 |
| DATA_3 | TS_3 |
| ... | ... |
| DATA_N | TS_N |

FIG. 4

| OBSTACLE_1 INFO | OBSTACLE_2 INFO | ... | OBSTACLE_N INFO | DATA_1 | TS_1 | DATA_2 | TS_2 | ... | DATA_N | TS_N |
|---|---|---|---|---|---|---|---|---|---|---|

Training Data 133

SENSOR AGGREGATION FRAMEWORK FOR AUTONOMOUS DRIVING VEHICLES

TECHNICAL FIELD

Embodiments of the present disclosure relate generally to operating autonomous vehicles. More particularly, embodiments of the disclosure relate to sensor aggregation framework for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

The operations of motion planning and control require a number of sensors to perform as each sensor has its respective limitations. For example, multiple sensors can collaborate to accurately identify and track objects (or obstacles) within an environment of a vehicle. The collaboration of the sensors generally requires multi-sensor fusion that involves timestamps alignment and sensor data aggregation. Conventionally, however, timestamps alignment is difficult to perform correctly and effectively, and sensor data aggregation generally creates conflicting results among the sensors.

BRIEF DESCRIPTION OF THE DRAWINGS

Embodiments of the disclosure are illustrated by way of example and not limitation in the figures of the accompanying drawings in which like references indicate similar elements.

FIG. 4 is a diagram illustrating an example of vehicle data and corresponding timestamps according to one embodiment.

FIG. 5 is a diagram illustrating an example of training data according to one embodiment.

DETAILED DESCRIPTION

Figure 1A:
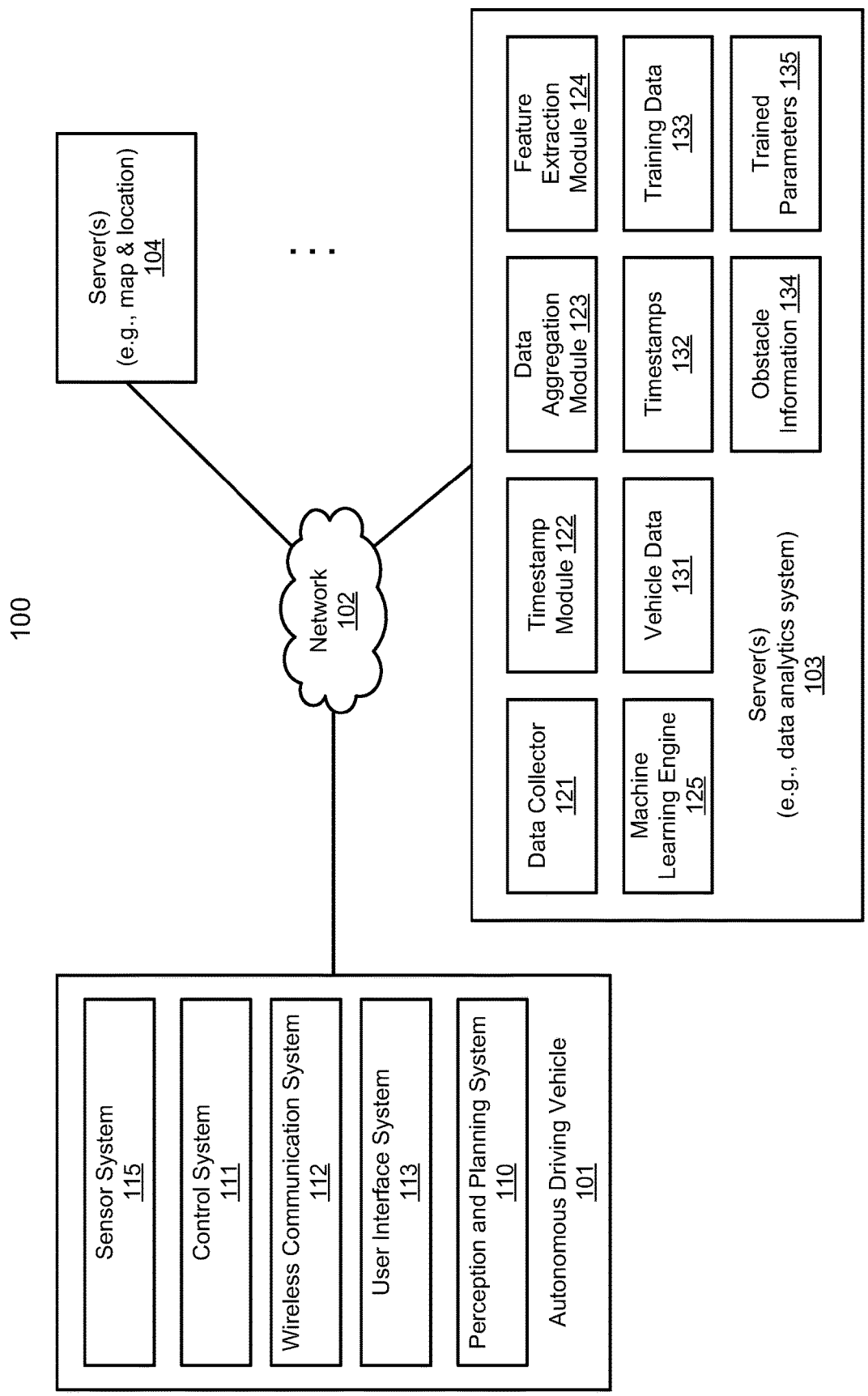
FIG. 1A is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when an autonomous driving vehicle is operated to enter a region of interest, the system collects sensor data from one or more sensors mounted on the autonomous driving vehicle. The sensor data includes vehicle data having information indicating driving commands (e.g., throttle, brake, steering commands) issued and responses of the vehicle (e.g., speeds, accelerations, decelerations, directions) captured by the sensors of the vehicle at different points in time (or time frames). The sensor data also includes obstacle (or object) information, such as obstacle position and obstacle reflectivity. Each vehicle data from the sensor data is respectively timestamped with a current time as it is collected. The sensor data is then extracted to respectively generate vehicle data, corresponding timestamps, and obstacle information that can be stored remotely on a centralized server and/or locally on a persistent storage drive. The extracted vehicle data, corresponding timestamps, and obstacle information are then aggregated to form training data. The training data is then used to train a set of parameters (e.g., using a machine learning engine, such as a neural network), which can be deployed for online control of the vehicle (e.g., motion planning and control). This way, timestamps are better aligned and conflicting results among sensors are reduced or eliminated.

In one embodiment, sensor data is collected from one or more sensors mounted on an autonomous driving vehicle (ADV) while the ADV is moving within a region of interest (ROI) that includes a number of obstacles. The sensor data includes obstacle information of the obstacles and vehicle data of the ADV. Each of the vehicle data is timestamped with a current time at which the vehicle data is captured to generate a number of timestamps that correspond to the vehicle data. The obstacle information, the vehicle data, and the corresponding timestamps are aggregated into training data. The training data is used to train a set of parameters that is subsequently utilized to predict at least in part future obstacle behaviors and vehicle movement of the ADV.

In one embodiment, prior to aggregating the obstacle information, the vehicle data, and the corresponding timestamps into the training data, the obstacle information and the vehicle data are extracted from the sensor data. In one embodiment, subsequent to aggregating the obstacle information, the vehicle data, and the corresponding timestamps into the training data, the set of parameters is trained using the training data to learn obstacle behaviors of the obstacles and current vehicle movement of the ADV.

In one embodiment, to aggregate the obstacle information, the vehicle data, and the corresponding timestamps into the training data, each of the vehicle data and its corresponding timestamp is appended to each other in a pairwise manner to form a number of vehicle data and corresponding timestamp pairs. The vehicle data and corresponding timestamp pairs are appended to each other. The appended vehicle data and corresponding timestamp pairs are appended to the obstacle information.

In another embodiment, sensor data is collected from one or more sensors mounted on an ADV while the ADV is operating in autonomous mode. Each of the sensor data is timestamped with a current time at which the sensor data is captured to generate a number of timestamps that correspond to the sensor data. Vehicle data of the ADV and obstacle information of perceived obstacles are extracted from the sensor data. Behaviors of the perceived obstacles and vehicle movement of the ADV are predicted based on the extracted vehicle data, the extracted obstacle information, the corresponding timestamps, and a set of training parameters that is previously trained to learn historical obstacle behaviors and vehicle movement of the ADV.

FIG. 1A is a block diagram illustrating an autonomous vehicle network configuration according to one embodiment of the disclosure. Referring to FIG. 1A, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
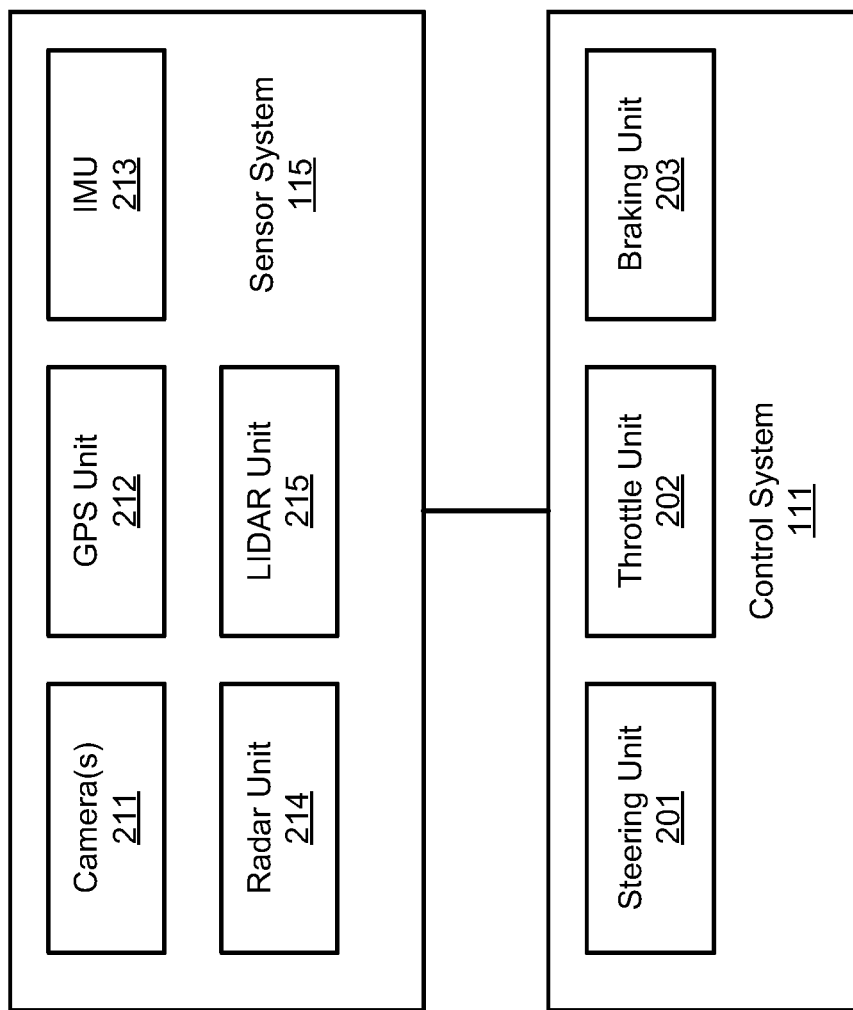
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1A, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 1B:
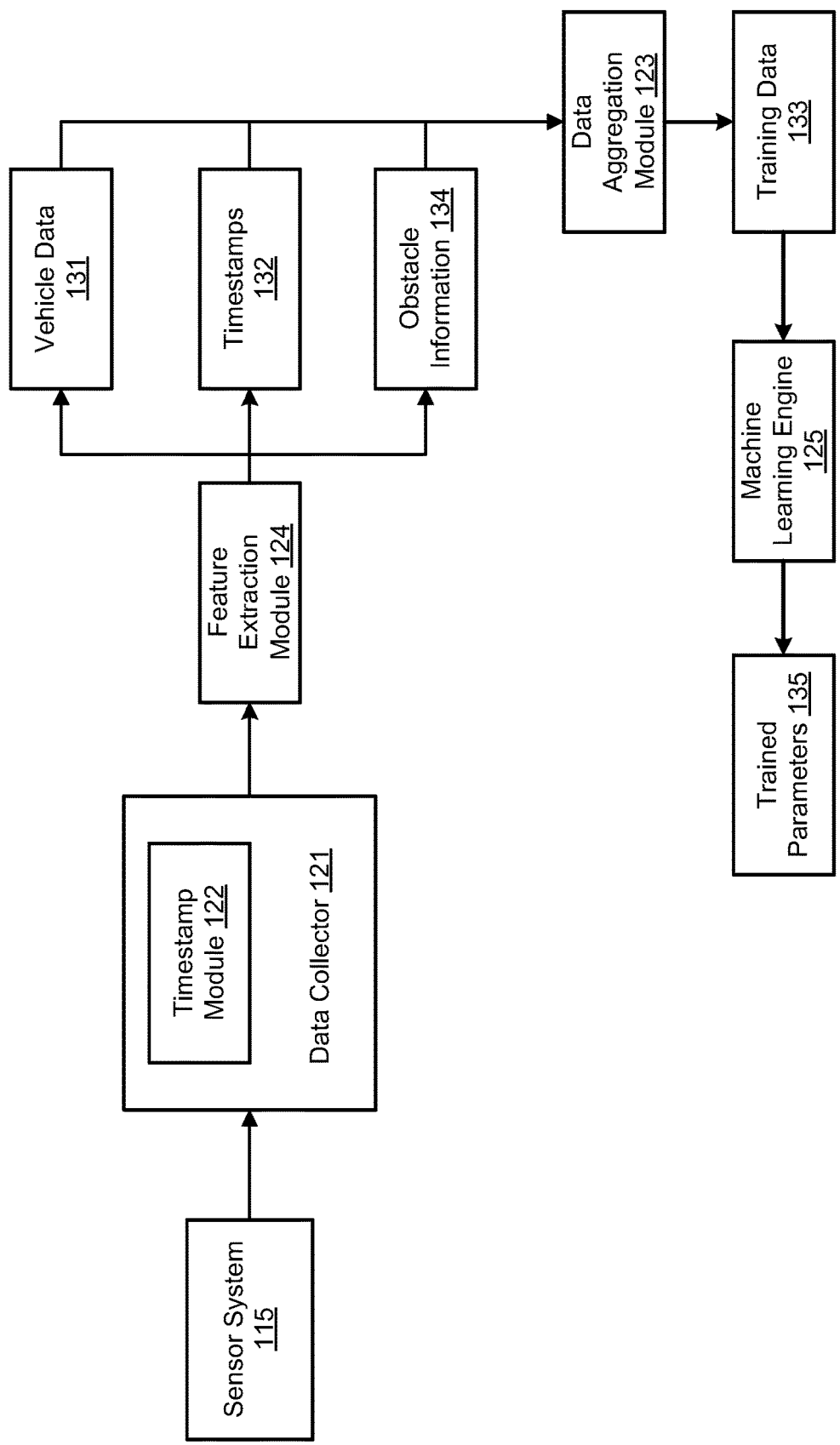
FIG. 1B is a block diagram illustrating a system for training sensor data according to one embodiment.

With continued reference to FIG. 1A and now FIG. 1B, which is a block diagram illustrating a system for training sensor data according to one embodiment, server 103 may be a data analytics system to perform data analytics services for a variety of clients. In one embodiment, data analytics system 103 includes data collector 121, timestamp module 122, data aggregation module 123, features extraction module 124, and machine learning engine 125.

Data collector 121 may collect and label sensor data from a variety of sensors mounted on autonomous vehicle 101. For example, referring to FIG. 6, when autonomous vehicle 101 is operated to enter a region of interest (ROI) 600, sensor system 115 may detect a number of obstacles (or objects) 601-604 within the ROI 600 and generate sensor data at different points in time for a particular time frame (e.g., 100 millisecond (ms), 1 second, or any suitable time period). As autonomous vehicle moves within ROI 600, additional sensor data are generated. ROI 600, for example, may be any region or area in which a vehicle can operate, such as at an intersection. Obstacles 601-604 for example may be another vehicle (e.g., autonomous or regular vehicle), a pedestrian, a building, or traffic related signs (e.g., stop signs, yield signs), etc. It should be appreciated that while FIG. 6 illustrates obstacles 601-604, any number of obstacles may exist within an ROI, such as ROI 600.

Figure 6:
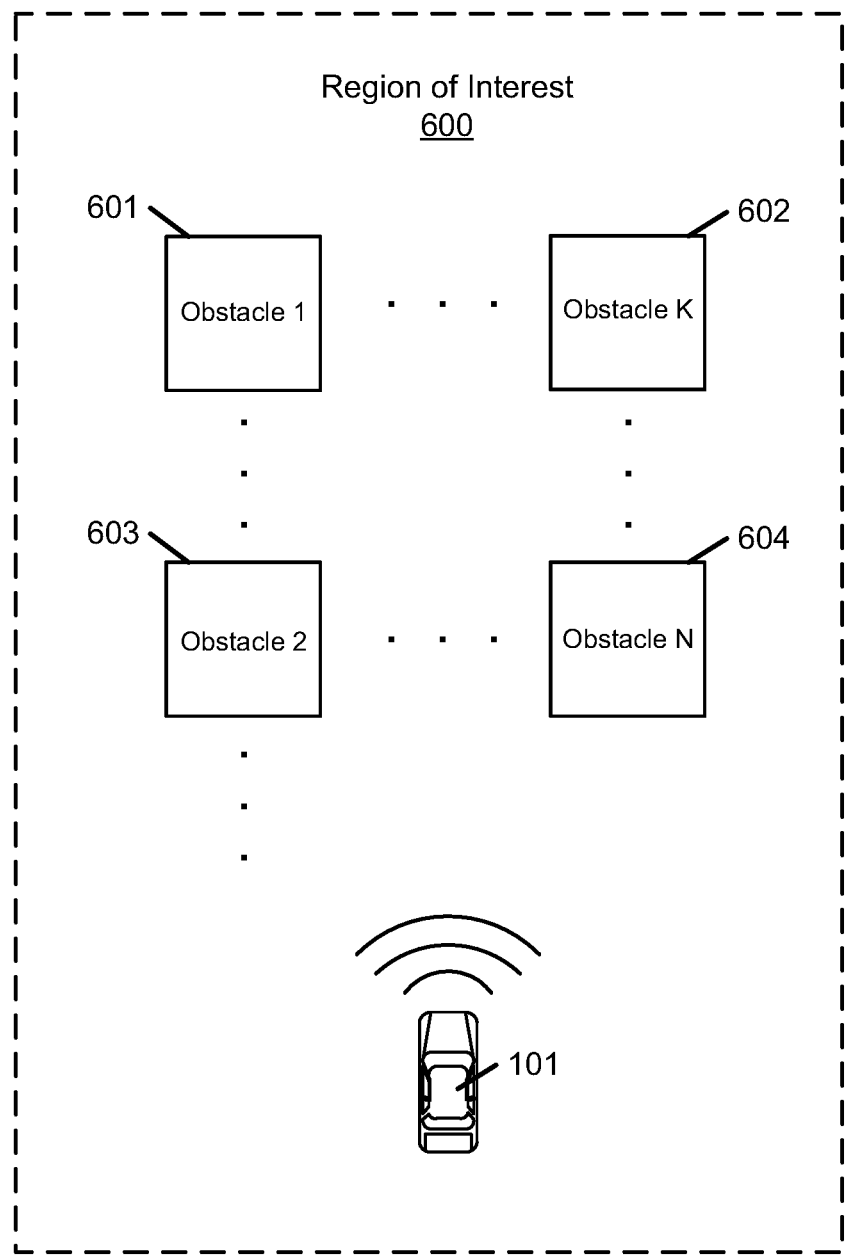
FIG. 6 is a diagram illustrating an autonomous vehicle operating within a region of interest that includes a number of obstacles according to one embodiment.

It should be appreciated that while FIG. 6 only illustrates one ROI, in operation, autonomous vehicle 101 may enter a variety of ROIs, and each ROI may have a different number of obstacles that are positioned differently depending on the region.

Referring back to FIGS. 1A-1B, data collector 121 may communicate with autonomous vehicle 101 over network 102 to acquire and label the sensor data from sensor system 115. The sensor data may include vehicle data indicating the driving commands (e.g., throttle, brake, steering commands) issued and responses of the vehicles (e.g., speeds, accelerations, decelerations, directions) captured by sensors of the vehicle 101 at different points in time. The sensor data may also include obstacle (or object) information that indicates a position (e.g., x, y, z coordinates) and reflectivity of each of the obstacles 601-604. While data collector 121 collects the sensor data, data collector 121 may invoke timestamp module 122 (which may be included in data collector 121) to timestamp some or all of the sensor data with a current time for a particular time frame.

Feature extraction module 124 may receive the sensor data along with the timestamps from data collector 121 and timestamp module 122 respectively, extract the sensor data and timestamps, and store the extracted information as vehicle data 131, corresponding timestamps 132, and obstacle information 134. The extracted information, for example, may be determined by feature extraction module 124 as informative and non-redundant, thereby facilitating subsequent learning of the extracted information. In more detail, feature extraction module 124 may extract (or filter) the data based on predetermined criteria. For example, in one embodiment the predetermined criteria may trigger a decision that vehicle data and obstacle information associated with obstacles 601-604 are informative features. Accordingly, the vehicle data and obstacle information are extracted from the collected sensor data, and stored as vehicle data 131 and obstacle information 134. In one embodiment, the predetermined criteria may trigger a decision to extract the timestamps, which are generated by timestamp module 122, that are associated with vehicle data 131. Accordingly, those timestamps may be extracted and stored as timestamps 132.

Referring now to FIG. 4, FIG. 4 is a diagram illustrating an example of vehicle data 131 and corresponding timestamps 132 according to one embodiment. In FIG. 4, vehicle data 131 may include a number of vehicle data (e.g., DATA_1, DATA_2, DATA_3, . . . , DATA_N) captured at different points in time within a time frame. Each of the vehicle data is associated with a corresponding timestamp (e.g., TS_1, TS_2, TS_3, . . . , TS_N) recorded with a current time at which the vehicle data was captured. The recorded timestamps may collectively be stored as timestamps 132. In one embodiment, each of the timestamps 132 may or may not be aligned with the current time at which the corresponding vehicle data was captured. In one embodiment, each of vehicle data 131 (e.g., DATA_1, DATA_2, DATA_3, . . . , DATA_N) may include information indicating the driving commands (e.g., throttle, brake, steering commands) issued and responses of the vehicles (e.g., speeds, accelerations, decelerations, directions) captured by the sensors of the vehicle 101 at a specific point in time, which may be within the particular time frame. In one embodiment, vehicle data 131, timestamps 132 and obstacle information 134 may be stored on a centralized server (e.g., server 103) and/or on a persistent storage device.

Referring back to FIGS. 1A-1B, vehicle data 131, timestamps 132, and obstacle information 134 may be provided to data aggregation module 123 to generate training data 133. For example, data aggregation module 123 may aggregate vehicle data 131, timestamps 132, and obstacle information 134 into a data format, as shown in FIG. 5, which is a diagram illustrating an example of training data 133 according to one embodiment. As shown in FIG. 5, training data 133 may include obstacle information (e.g., OBSTACLE_1 INFO, OBSTACLE_2 INFO, . . . , OBSTACLE_N INFO) associated with different obstacles (e.g., obstacles 601-604 of FIG. 6) that may be appended to each other. Training data 133 may further include vehicle data 131, and corresponding timestamps 132. Each of the vehicle data 131 (e.g., DATA_1) and its corresponding timestamp (e.g., TS_1) may be appended to each other in a pairwise manner. The pairs of vehicle data and corresponding timestamps may be appended to the obstacle information to form training data 133.

Based on training data 133, machine learning engine 125 may generate or train a set of parameters, algorithms, and/or predictive models 135 (which may be stored on server 103 and/or a persistent storage device). For example, in one embodiment, machine learning engine 125 may invoke one or more machine learning models/algorithms (e.g., deep learning architectures such as deep neural networks, convolutional neural networks, deep belief networks and/or recurrent neural networks) to continuously determine or learn the obstacle information (i.e., obstacle behavior) along with the vehicle data (i.e., vehicle movement) and their corresponding timestamps. Since parameters 135 are trained using aggregated obstacle information, vehicle data, and corresponding timestamps obtained over a time frame prior to providing to machine learning engine 125, timestamps therefore are optimally aligned and conflicting results among the sensors are reduced or eliminated. Trained parameters 135 then may be deployed for online control of a vehicle (e.g., autonomous vehicle 101). That is, as discussed in more detail herein below, trained parameters 135 may be utilized to predict future obstacle behaviors and vehicle movement of the vehicle.

It should be appreciated that the operations of data collection, timestamping, data aggregation, feature extraction and machine learning, as previously described in connection with FIGS. 1A-1B, are performed as autonomous vehicle 101 enters and operates within a variety of regions of interest at different time frames, which may total up to 10-24 hours or more. Accordingly, multiple sets of training data (such as training data 133) are generated as a result for the different ROIs and time frames.

It should also be appreciated that while the operations of data collection, timestamping, data aggregation, feature extraction and machine learning, as previously described in connection with FIGS. 1A-1B, can be performed offline, for example, by another data processing system (e.g., centralized server) such as server 103, in another embodiment, such operations can be performed online, for example, by perception and planning system 110. That is, perception and planning system 110 may include data collector 121, timestamp module 122, data aggregation module 123, feature extraction module 124, and machine learning engine 125 as previously described in this application.

Figure 3A:
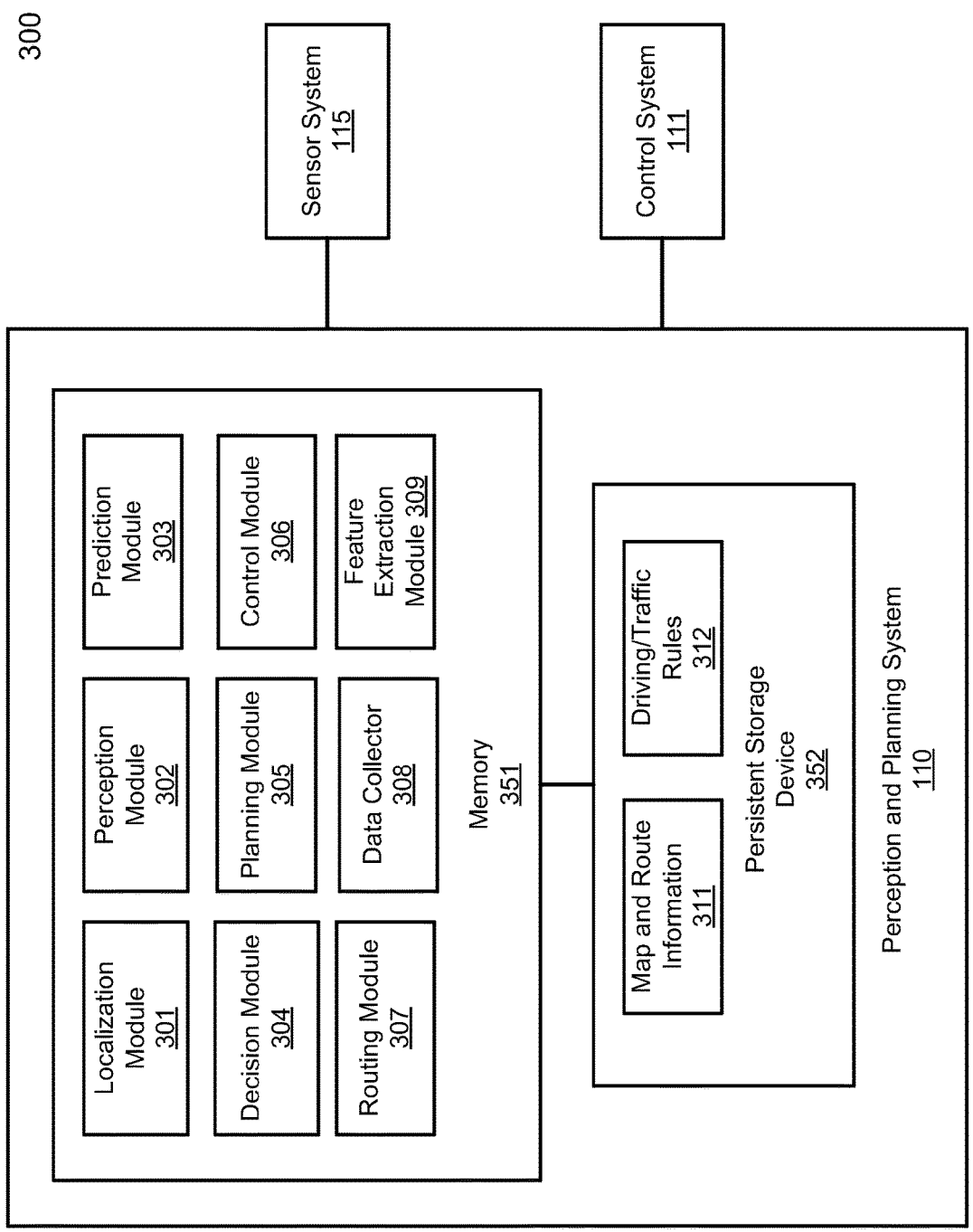
FIGS. 3A-3B are block diagrams illustrating an example of a perception and planning system used with an autonomous vehicle according to one embodiment.
Figure 3B:
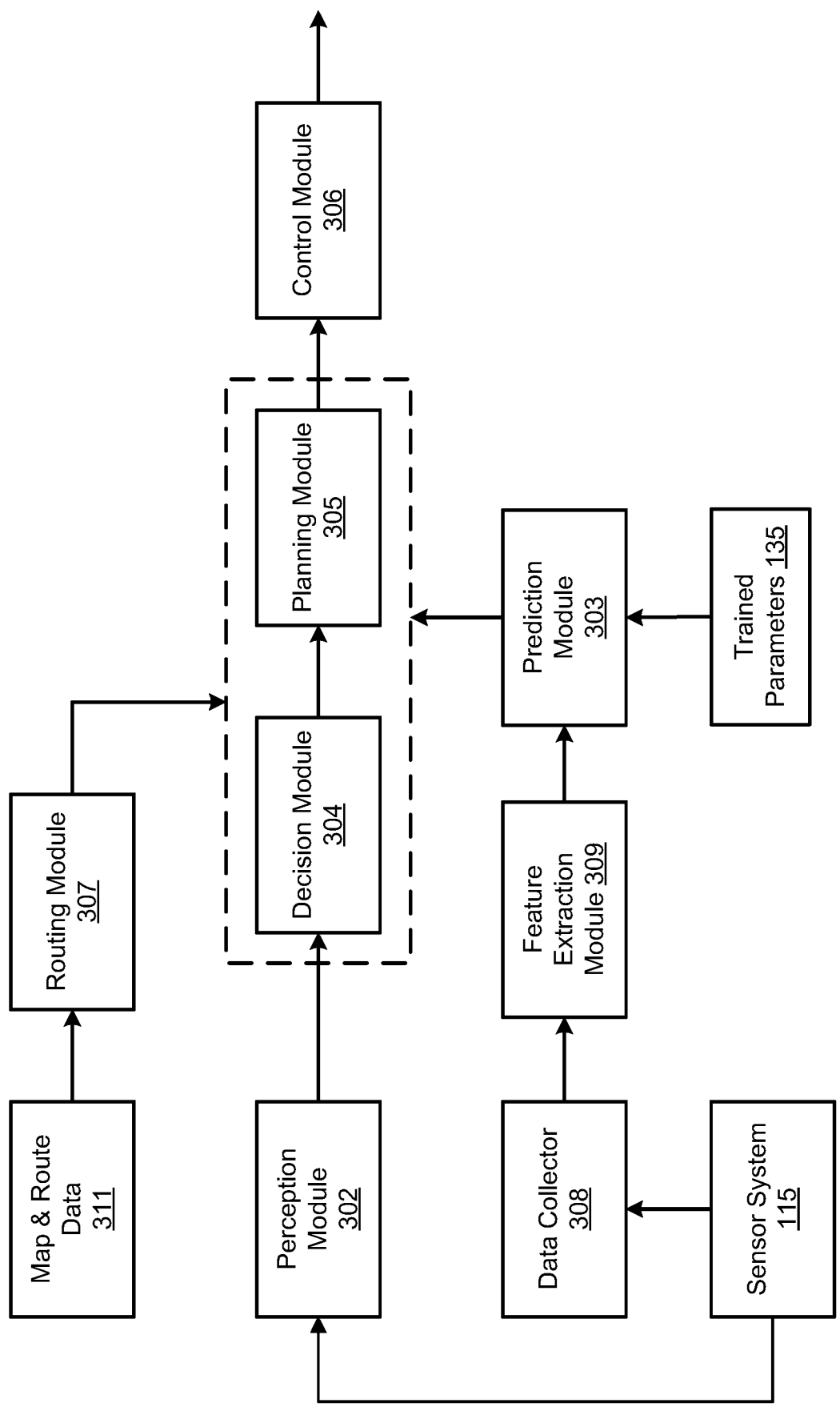

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, data collector 308 and feature extraction module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312.

For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

With continued reference to FIGS. 3A-3B, data collector 308 (which may be similar to data collector 121) may collect and label sensor data from a variety of sensors mounted on autonomous vehicle 101 (i.e., sensor system 115) while autonomous vehicle 101 is operating in autonomous or manual mode. The collected sensor data, for example, may include vehicle data and obstacle information of the perceived obstacles. As previously described, vehicle data may include information indicating the driving commands (e.g., throttle, brake, steering commands) issued and responses of the vehicles (e.g., speeds, accelerations, decelerations, directions) captured by the sensors of the vehicle 101 at different points in time. Obstacle information may include a position (e.g., x, y, z coordinates) and reflectivity of each obstacle detected by the sensors of vehicle 101. As with data collection 121, in one embodiment data collector 308 may invoke a timestamp module (not shown) to timestamp each sensor data with a current time, thereby generating a variety of timestamps for the collected sensor data.

Feature extraction module 309 may extract certain features from the collected sensor data that are determined to be informative and non-redundant based on predetermined criteria. For example, the predetermined criteria may indicate that the vehicle data and obstacle information from the collected sensor data are informative features. Accordingly, the predetermined criteria may trigger feature extraction module 309 to extract the vehicle data and obstacle information from the sensor data.

Based on extracted vehicle data, obstacle information, recorded timestamps, and/or trained parameters 135 (which may be received or retrieved from server 103 and/or persistent storage device 352), prediction module 303 may predict behaviors of obstacles (or objects) and vehicle movement of autonomous vehicle 101 under the circumstances. For example, to predict a behavior of an obstacle, prediction module 303 may perform a delta operation between the extracted obstacle information (e.g., obstacle position) and the obstacle information included in trained parameters 135 (e.g., historical obstacle information). For example, prediction module 303 may take a difference between a point cloud of the extracted obstacle information (e.g., LIDAR data from LIDAR unit 215) and a point cloud of the obstacle information from trained parameters 135. Similarly, to predict the movement of autonomous vehicle 101, in one embodiment prediction module 303 may respectively perform delta operations between the extracted vehicle data and recorded timestamps, and the vehicle data and corresponding timestamps from trained parameters 135 (e.g., historical vehicle data and corresponding timestamps). Outputs from the delta operations may be provided to decision module 304 and/or planning module 305 to plan a path or route for the autonomous vehicle 101, as well as driving parameters (e.g., distance, speed, and/or turning angle). This way, as trained parameters are provided to prediction module 303 to aid the planning, prediction module 303 can generate precise planning and control data, thereby improving the control and drive the autonomous vehicle 101.

Figure 7:
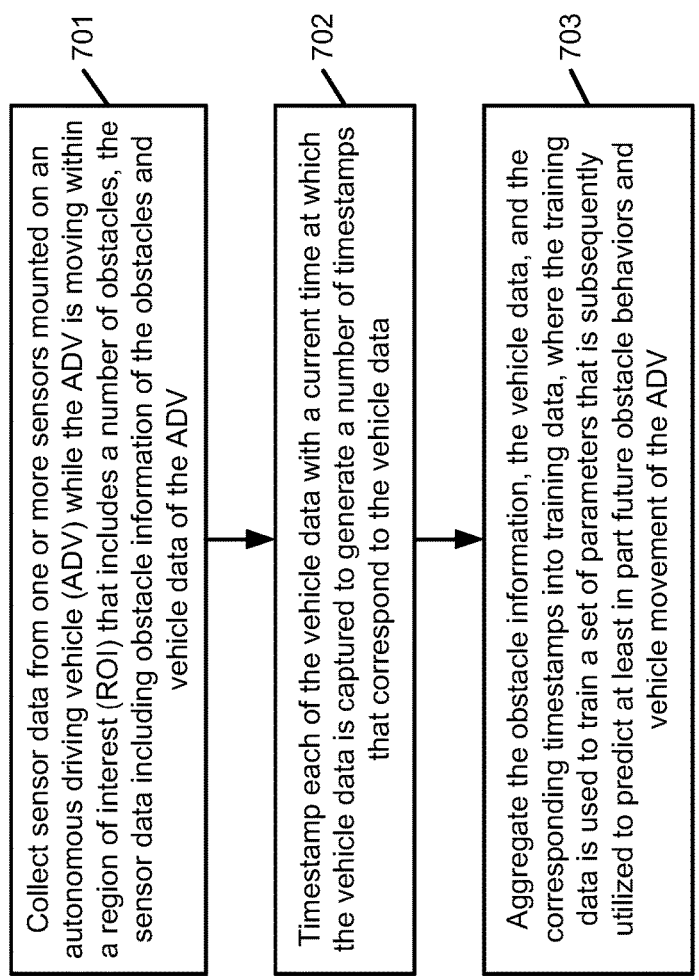
FIG. 7 is a flow diagram of a method of training sensor data according to one embodiment.

FIG. 7 is a flow diagram of a method of training sensor data according to one embodiment. Process 700 may be performed by processing logic which may include software, hardware, or a combination thereof. For example, process 700 may be performed by server 103 and/or perception and planning system 110 of FIG. 1.

Referring to FIG. 7, at block 701, the processing logic collects sensor data from one or more sensors mounted on an ADV while the ADV is moving within an ROI that includes a number of obstacles. In one embodiment, the sensor data includes obstacle information of the obstacles and vehicle data of the ADV. At block 702, the processing logic timestamps each of the vehicle data with a current time at which the vehicle data is captured to generate a number of timestamps that correspond to the vehicle data. At block 703, the processing logic aggregates the obstacle information, the vehicle data, and the corresponding timestamps into training data. In one embodiment, the training data is used to train a set of parameters that is subsequently utilized to predict at least in part future obstacle behaviors and vehicle movement of the ADV.

Figure 8:
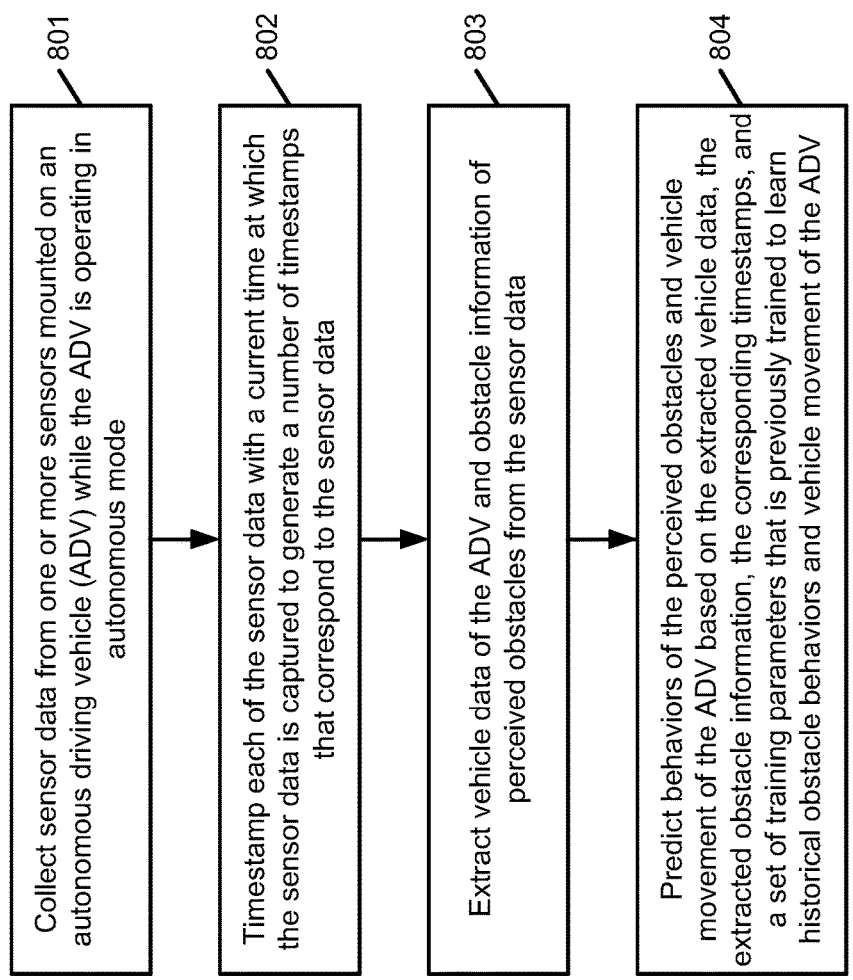
FIG. 8 is a flow diagram of a method for operating an autonomous vehicle according to one embodiment.

FIG. 8 is a flow diagram of a method for operating an autonomous vehicle according to one embodiment. Process 800 may be performed by processing logic which may include software, hardware, or a combination thereof. For example, process 800 may be performed by the perception and planning system 110 of FIG. 1.

Referring to FIG. 8, at block 801, the processing logic collects sensor data from one or more sensors mounted on an ADV while the ADV is operating in autonomous mode. At block 802, the processing logic timestamps each of the sensor data with a current time at which the sensor data is captured to generate a number of timestamps that correspond to the sensor data. At block 803, the processing logic extracts vehicle data of the ADV and obstacle information of perceived obstacles from the sensor data. At block 804, the processing logic predicting behaviors of the perceived obstacles and vehicle movement of the ADV based on the extracted vehicle data, the extracted obstacle information, the corresponding timestamps, and a set of training parameters that is previously trained to learn historical obstacle behaviors and vehicle movement of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
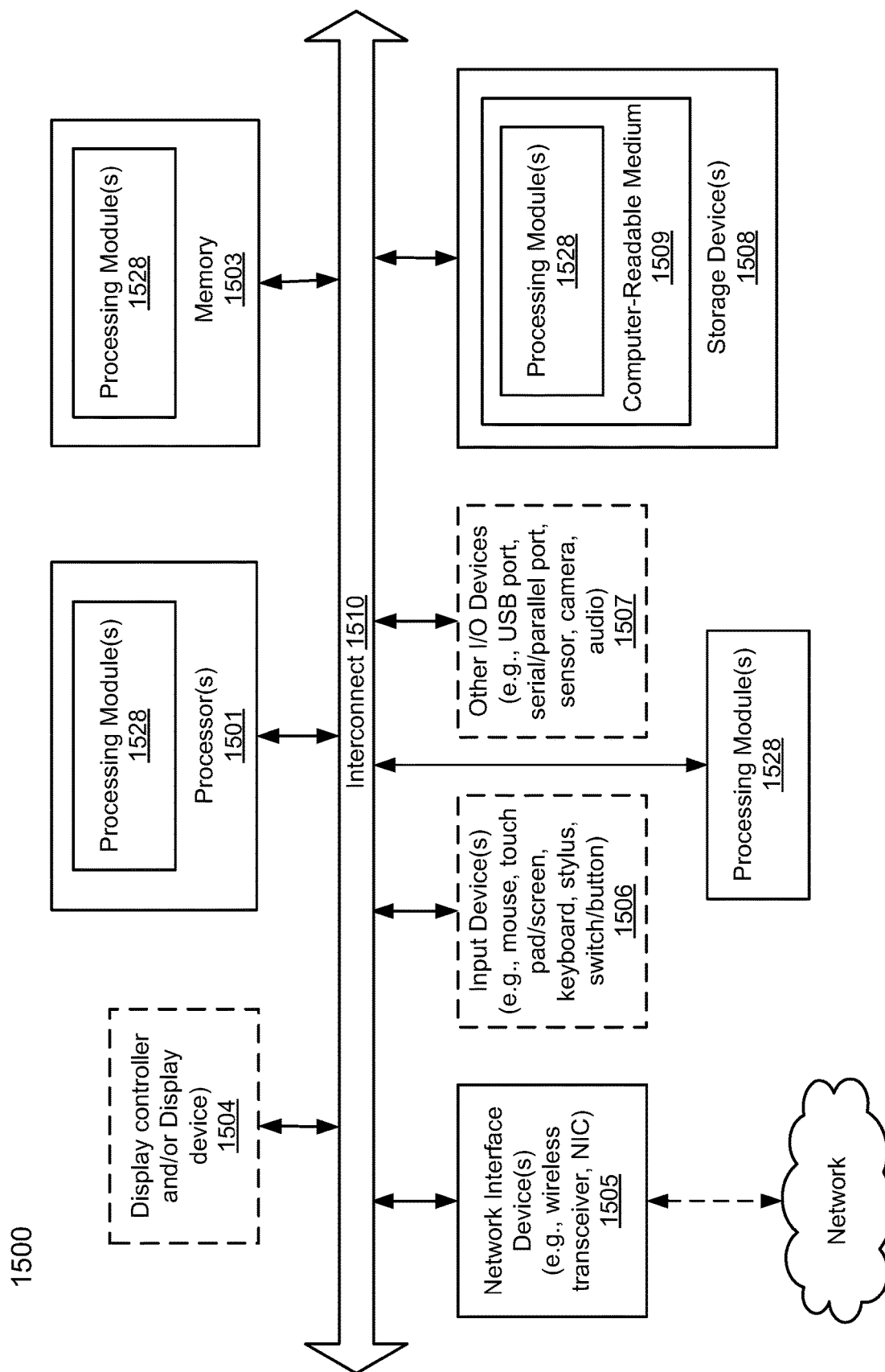
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, data collector 308, feature extraction module 309, and the modules, engines or units in server 103 of FIGS. 1A-1B as previously described. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    collecting sensor data from one or more sensors mounted on an autonomous driving vehicle (ADV) while the ADV is operating in autonomous mode;
    timestamping each of the sensor data with a current time at which the sensor data is captured to generate a plurality of timestamps that correspond to the sensor data, the sensor data including vehicle data of the ADV and obstacle information of perceived obstacles, each of the vehicle data including driving commands issued and responses of the ADV at a specific point in time;
    extracting the vehicle data of the ADV and the obstacle information of the perceived obstacles from the sensor data; and
    predicting behaviors of the perceived obstacles and vehicle movement of the ADV based on the extracted vehicle data, the extracted obstacle information, the corresponding timestamps, and a set of training parameters that is previously trained to learn historical obstacle behaviors and vehicle movement of the ADV.

2. The method of claim 1, wherein predicting behaviors of the perceived obstacles and vehicle movement of the ADV comprises:
    performing a delta operation between the extracted vehicle data and vehicle data obtained from the set of training parameters.

3. The method of claim 1, wherein predicting behaviors of the perceived obstacles and vehicle movement of the ADV comprises:

performing the delta operation between the extracted obstacle information and obstacle information obtained from the set of training parameters.

4. The method of claim 1, wherein predicting behaviors of the perceived obstacles and vehicle movement of the ADV comprises:
determining a difference between a point cloud image of the extracted obstacle information and a point cloud image of obstacle information obtained from the set of training parameters.

5. The method of claim 1, wherein the set of training parameters includes a plurality of appended vehicle data and corresponding timestamp pairs appended to the obstacle information, wherein each of the obstacle information is appended to each other.

6. The method of claim 1, wherein the obstacle information includes positions and reflectivity of the obstacles.

7. The method of claim 1, wherein collecting sensor data from one or more sensors mounted on the ADV is performed within a predetermined time frame.

8. A non-transitory machine-readable medium having instructions stored therein, which when executed by a processor, cause the processor to perform operations, the operations comprising:
collecting sensor data from one or more sensors mounted on an autonomous driving vehicle (ADV) while the ADV is operating in autonomous mode;
timestamping each of the sensor data with a current time at which the sensor data is captured to generate a plurality of timestamps that correspond to the sensor data, the sensor data including vehicle data of the ADV and obstacle information of perceived obstacles, each of the vehicle data including driving commands issued and responses of the ADV at a specific point in time;
extracting the vehicle data of the ADV and the obstacle information of the perceived obstacles from the sensor data; and
predicting behaviors of the perceived obstacles and vehicle movement of the ADV based on the extracted vehicle data, the extracted obstacle information, the corresponding timestamps, and a set of training parameters that is previously trained to learn historical obstacle behaviors and vehicle movement of the ADV.

9. The non-transitory machine-readable medium of claim 8, wherein predicting behaviors of the perceived obstacles and vehicle movement of the ADV comprises:
performing a delta operation between the extracted vehicle data and vehicle data obtained from the set of training parameters.

10. The non-transitory machine-readable medium of claim 8, wherein predicting behaviors of the perceived obstacles and vehicle movement of the ADV comprises:
performing the delta operation between the extracted obstacle information and obstacle information obtained from the set of training parameters.

11. The non-transitory machine-readable medium of claim 8, wherein predicting behaviors of the perceived obstacles and vehicle movement of the ADV comprises:
determining a difference between a point cloud image of the extracted obstacle information and a point cloud image of obstacle information obtained from the set of training parameters.

12. The non-transitory machine-readable medium of claim 8, wherein the set of training parameters includes a plurality of appended vehicle data and corresponding timestamp pairs appended to the obstacle information, wherein each of the obstacle information is appended to each other.

13. The non-transitory machine-readable medium of claim 8, wherein the obstacle information includes positions and reflectivity of the obstacles.

14. The non-transitory machine-readable medium of claim 8, wherein collecting sensor data from one or more sensors mounted on the ADV is performed within a predetermined time frame.

15. A data processing system, comprising:
a processor; and
a memory coupled to the processor to store instructions, which when executed by the processor, cause the processor to perform operations, the operations including
collecting sensor data from one or more sensors mounted on an autonomous driving vehicle (ADV) while the ADV is operating in autonomous mode;
timestamping each of the sensor data with a current time at which the sensor data is captured to generate a plurality of timestamps that correspond to the sensor data, the sensor data including vehicle data of the ADV and obstacle information of perceived obstacles, each of the vehicle data including driving commands issued and responses of the ADV at a specific point in time;
extracting the vehicle data of the ADV and the obstacle information of the perceived obstacles from the sensor data; and
predicting behaviors of the perceived obstacles and vehicle movement of the ADV based on the extracted vehicle data, the extracted obstacle information, the corresponding timestamps, and a set of training parameters that is previously trained to learn historical obstacle behaviors and vehicle movement of the ADV.

16. The data processing system of claim 15, wherein predicting behaviors of the perceived obstacles and vehicle movement of the ADV comprises:
performing a delta operation between the extracted vehicle data and vehicle data obtained from the set of training parameters.

17. The data processing system of claim 15, wherein predicting behaviors of the perceived obstacles and vehicle movement of the ADV comprises:
performing the delta operation between the extracted obstacle information and obstacle information obtained from the set of training parameters.

18. The data processing system of claim 15, wherein predicting behaviors of the perceived obstacles and vehicle movement of the ADV comprises:
determining a difference between a point cloud image of the extracted obstacle information and a point cloud image of obstacle information obtained from the set of training parameters.

19. The data processing system of claim 15, wherein the set of training parameters includes a plurality of appended vehicle data and corresponding timestamp pairs appended to the obstacle information, wherein each of the obstacle information is appended to each other.

20. The data processing system of claim 15, wherein the obstacle information includes positions and reflectivity of the obstacles.

21. The data processing system of claim 15, wherein collecting sensor data from one or more sensors mounted on the ADV is performed within a predetermined time frame.

* * * * *